United States Patent
Zheng et al.

(10) Patent No.: US 10,735,061 B1
(45) Date of Patent: *Aug. 4, 2020

(54) SYSTEMS AND METHODS FOR CHANNEL CORRELATION BASED USER DETECTION IN AN UPLINK MULTI-USER TRANSMISSION OF A MULTIPLE-INPUT MULTIPLE-OUTPUT NETWORK

(71) Applicant: NXP USA, Inc., Austin, TX (US)

(72) Inventors: Xiayu Zheng, San Jose, CA (US); Bo Yu, San Jose, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,758

(22) Filed: Sep. 3, 2019

Related U.S. Application Data

(63) Continuation of application No. 16/031,693, filed on Jul. 10, 2018, now Pat. No. 10,404,336.

(60) Provisional application No. 62/533,565, filed on Jul. 17, 2017.

(51) Int. Cl.
| | |
|---|---|
| *H04B 7/0456* | (2017.01) |
| *H04L 25/02* | (2006.01) |
| *H04L 25/00* | (2006.01) |
| *H04B 7/08* | (2006.01) |
| *H04B 7/06* | (2006.01) |

(52) U.S. Cl.
CPC ............ *H04B 7/0456* (2013.01); *H04B 7/06* (2013.01); *H04B 7/0626* (2013.01); *H04B 7/0632* (2013.01); *H04B 7/08* (2013.01); *H04L 25/00* (2013.01); *H04L 25/0202* (2013.01); *H04L 25/024* (2013.01); *H04L 25/0204* (2013.01); *H04L 25/026* (2013.01); *H04L 25/0208* (2013.01); *H04L 25/0212* (2013.01); *H04L 25/0242* (2013.01)

(58) Field of Classification Search
CPC combination set(s) only.
See application file for complete search history.

(56) References Cited

U.S. PATENT DOCUMENTS

| | | | |
|---|---|---|---|
| 7,068,981 B2 | 6/2006 | Sim | |
| 7,848,218 B2 | 12/2010 | Lee | |
| 8,948,152 B2 * | 2/2015 | Seok | ............. H04L 1/0025 370/338 |
| 10,404,336 B1 * | 9/2019 | Zheng | ............. H04L 25/024 |
| 2003/0043767 A1 | 3/2003 | Pan | |
| 2003/0181170 A1 | 9/2003 | Sim | |
| 2009/0060082 A1 | 3/2009 | Yuda | |
| 2009/0092087 A1 | 4/2009 | Walton | |
| 2009/0262871 A1 | 10/2009 | Jung | |

(Continued)

*Primary Examiner* — Linda Wong

(57) ABSTRACT

Embodiments described herein methods and systems for channel correlation based user detection in an uplink multiuser transmission of a multiple-input multiple-output (MIMIO) network. In some embodiments, the channel correlation based user detection may be used in 802.11 UL MUMIMO systems. For example, an access point may detect whether a client station responds to a trigger frame and then adjust a channel matrix accordingly to reflect whether the client station is responsive. The access point may then decode received data signals based on the adjusted channel matrix that reflects whether a client station has transmitted.

22 Claims, 4 Drawing Sheets

(56) References Cited

U.S. PATENT DOCUMENTS

| | | | |
|---|---|---|---|
| 2010/0074301 A1* | 3/2010 | Howard | H04B 7/0417 |
| | | | 375/130 |
| 2010/0290548 A1 | 11/2010 | Hoshino | |
| 2011/0002411 A1 | 1/2011 | Forenza | |
| 2011/0038439 A1 | 2/2011 | Winters | |
| 2015/0256246 A1* | 9/2015 | Ishihara | H04B 7/0452 |
| | | | 375/267 |
| 2016/0249371 A1* | 8/2016 | Zhou | H04W 74/008 |
| 2017/0374571 A1 | 12/2017 | Zhang | |
| 2018/0227037 A1 | 8/2018 | Ahmed Ouameur | |
| 2018/0352550 A1 | 12/2018 | Wilhelnnsson | |

* cited by examiner

SYSTEMS AND METHODS FOR CHANNEL CORRELATION BASED USER DETECTION IN AN UPLINK MULTI-USER TRANSMISSION OF A MULTIPLE-INPUT MULTIPLE-OUTPUT NETWORK

CROSS-REFERENCE TO RELATED APPLICATION

This disclosure is a continuation of U.S. patent application Ser. No. 16/031,693, filed Jul. 10, 2018 (currently allowed), which claims the benefit under 35 U.S.C. § 119(e) of U.S. Provisional Patent Application No. 62/533,565, filed on Jul. 17, 2017, which are hereby expressly incorporated by reference herein in their entireties.

FIELD OF USE

This disclosure relates to multi-user detection in a wireless local area network (WLAN), and specifically, to channel correlation based user detection in an uplink multiuser transmission of a multiple-input multiple-output (MIMIO) network.

BACKGROUND OF THE DISCLOSURES

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In existing 802.11 WLANs, a wireless access point (AP) is usually configured to transmit data downlink to multiple client stations (STAs), or to receive data uplink from the multiple client STAs. The downlink and/or uplink transmission is defined by the 802.11 standards. For example, under the 802.11ax uplink (UL) multi-user (MU) MIMO, an AP may receive simultaneous data frames from more than one non-AP STAs. Such UL MUMIMO transmission is preceded by a Trigger Frame (TF) from the AP. Upon receiving a TF from the AP, the non-AP STA may transmit a trigger-based (TB) PLCP protocol data unit (PPDU) for UL MUMIMO transmission. For each TF PPDU transmission, the non-AP STA transmits within an allocated spatial stream over the allocated resource unit (RU) according to TF. However, when the client STA fails to respond to the TF, e.g., without transmitting a PPDU to the AP, the AP is not made aware that no PPDU is coming from the failed STA, and still assumes that all STAs indicated in the TF would transmit some data to the AP. In this case, when the AP attempts to decode the received data from STAs, the misassumption that the received data is from all intended STAs may lead to inaccurate decoding result and thus impair the performance of the AP receiver.

SUMMARY

Embodiments described herein provide a method for detecting a client station based on channel correlation in an uplink multi-user transmission of a multiple-input multiple-output network. A number of trigger frames may be transmitted to initiate uplink transmission transmitting, from a wireless access point to a number of client stations. A number of uplink data signals may be received, at the wireless access point, via a number of channels from the number of client stations receiving. A channel matrix may be determined indicative of channel coefficients corresponding to the number of channels based on the received uplink data signals. For each client station, a respective correlation indicator may be generated based on the channel coefficients. A respective client station may then be detected by determining whether the respective client station has transmitted a respective uplink data signal based on respective correlation indicators corresponding to the number of client stations. The channel matrix may then be updated by removing columns corresponding to the respective client station when the respective client station has not transmitted a respective uplink data signal. The updated estimated channel matrix may be used for decoding the received number of uplink data signals.

In some implementations, a pre-defined matrix is retrieved based on a number total number of spatial streams. sing the pre-defined matrix to generate the channel matrix comprised of a number of sub-matrices based on the received number of uplink data signals. Each of the number of sub-matrices corresponding to a respective channel from the number of channels.

In some implementations, for each client station from the number of client stations, a respective channel vector may be estimated based on a respective uplink data signal received from the respective channel. The estimated respective channel vectors may be combined for the number of client stations to obtain a joint estimated channel matrix.

In some implementations, for each column in the joint estimated channel matrix, a respective correlation value between channel coefficients of two neighboring tones may be calculated.

In some implementations, for each client station, a respective sum of correlation values may be generated corresponding to columns of the joint estimated channel matrix that correspond to the respective client station.

In some implementations, a target receive power value may be retrieved corresponding to the respective client station. A power difference may be computed between the retrieved target receive power value and a maximum target receive power value among the number of client stations. The power difference may be added to the respective sum of correlation values.

In some implementations, a product of a power value may be computed corresponding to a respective spatial stream and a sum of correlations for phase-only quantized channel at the respective spatial stream.

In some implementations, a difference between a maximum sum of correlation values among all client stations and the sum of correlation values corresponding to a particular client station from the number of client stations may be determined. The difference may be compared with a pre-defined threshold.

In some implementations, in response to determining that the difference is greater than the pre-defined threshold, the joint estimated channel matrix may be updated by removing a channel vector corresponding to the particular client station.

In some implementations, at the wireless access point, a number of uplink data signals may be received via a number of resource units from the number of client stations, wherein each client station occupies a respective resource unit. The respective correlation indicator may be retrieved based on the channel coefficients subject to a respective resource unit. The resource unit may then be determined as available or not based on respective correlation indicators corresponding to a number of resource units.

Embodiments described herein further provide a system for detecting a client station based on channel correlation in an uplink multi-user transmission of a multiple-input multiple-output network. The system includes a wireless transceiver configured to transmit, from a wireless access point to a number of client stations, a number of trigger frames to initiate uplink transmission, and receive, at the wireless access point, a number of uplink data signals via a number of channels from the number of client stations. The system further includes processing circuitry configured to determine a channel matrix indicative of channel coefficients corresponding to the number of channels based on the received uplink data signals. For each client station, the processing circuitry is further configured to generate a respective correlation indicator based on the channel coefficients, detect a respective client station by determining whether the respective client station has transmitted a respective uplink data signal based on respective correlation indicators corresponding to the number of client stations, and update the channel matrix by removing columns corresponding to the respective client station when the respective client station has not transmitted a respective uplink data signal. The processing circuitry is further configured to use the updated joint estimated channel matrix for decoding the received number of uplink data signals.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for channel correlation based user detection in an uplink multiuser transmission of a multiple-input multiple-output (MIMO) network. In some embodiments, the channel correlation based user detection may be used in 802.11 UL MUMIMO systems.

Figure 1:
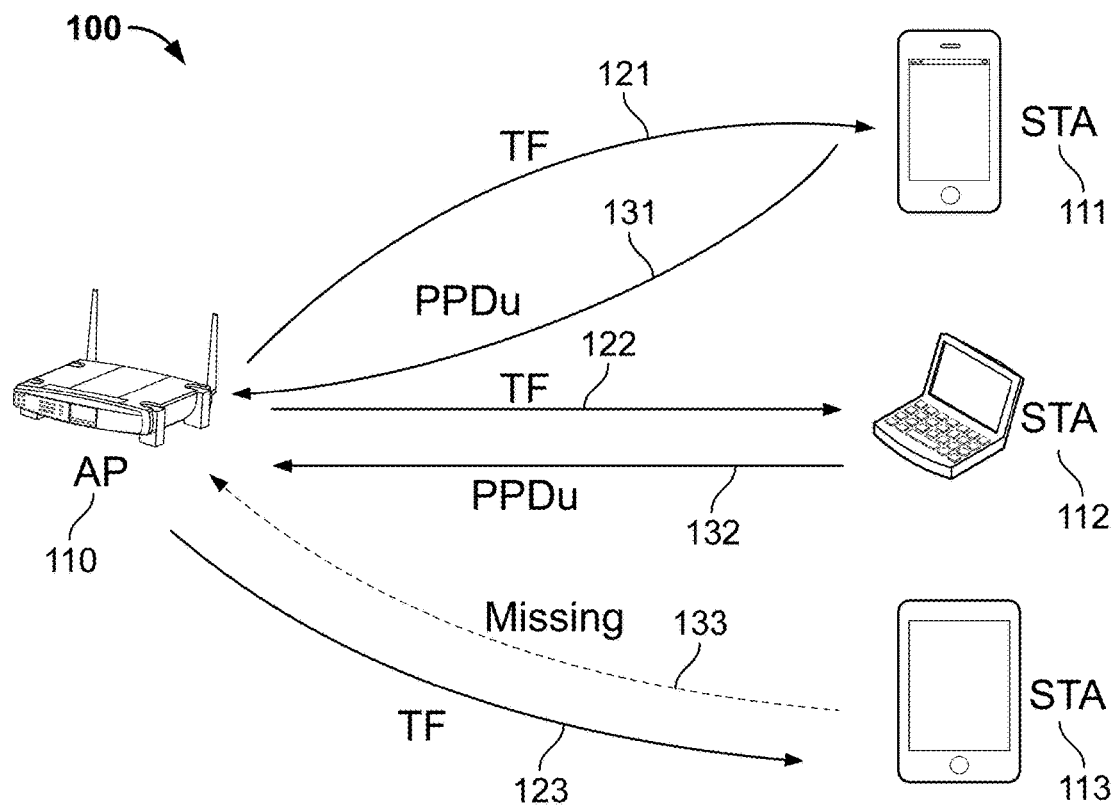
FIG. 1 is a block diagram illustrating example data frame exchange in an UL MUMIMO system, according to some embodiments described herein.

FIG. 1 is a block diagram 100 illustrating example data frame exchange in an UL MUMIMO system, according to some embodiments described herein. As shown in diagram 100, a WLAN may include a wireless AP 110, which is configured to communicate with one or more client STAs 111, 112 and 113. According to the 802.11ax UL MUMIMO standard, the AP 110 may send a TF, e.g., 121, 122, 123, to the client STAs 111-113, respectively, to initiate uplink transmission from the STAs to the AP. The TF 121-123 may be used to solicit and allocate resources for uplink transmissions from the STAs 111-113, which may transmit uplink PPDUs 131-132 after a short interframe space (SIFS). The TF 121-123 usually carry other information required by the responding STA 111-113 to send an PPDU 131 or 132, respectively. For example, a TF 121-123 includes a data field for common information intended for all STAs, which defines the common parameters among all users. The common information includes a carrier sensing (CS) required filed (set to one to indicate that the STAs identified in the user information fields are required to use energy detection (ED) to sense the medium and to consider the medium state in determining whether or not to respond), a bandwidth (BW) field indicating the signal BW in the HE-SIG-A field of PPDU 131-132, a guard interval (GI) and long training field (LTF) type field (which is 1× or 2× or 4×LTF plus GI), the number of HE-LTF symbols in the PPDU 131 or 132, etc. For UL MUMIMO under 802.11ax, each non-AP STA 111-113 may occupy a part of the spatial streams that is defined in the TF 121-123.

The TF 121-123 further includes user information that defines user specific parameters for each specific non-AP STA 111-113, e.g., based on association identifier (AID) match. The user information usually includes the AID field (e.g., 12-bit least significant bits of the AID of the intended STA), a resource unit (RU) allocation field that defines the RU used by the respective STA, a modulation and coding scheme (MCS) field that defines the modulation scheme, a spatial stream (SS) allocation field that includes the spatial stream information to be used for the STA to transmit uplink data, etc.

In response to the TFs 121-123, usually after an SIFS, the STAB 111-113 may start transmitting PPDUs 131-132, respectively, using parameters specified in the TFs. For example, each STA 111-113 may send the PPDU packet within an allocated spatial stream defined in the TFs. For example, the PPDUs 131 or 132 may include data fields indicating the modulation scheme, a high-efficiency short training field (HE-STF) that defines a short symbol duration to be 8 μs, a high-efficiency long training field (HE-LTF) which defines the symbol duration to be 3.2, 6.4 or 12.8 μs plus the guard interval per symbol, a HE-Data field containing user data for the respective STA, and/or the like.

In some scenarios, however, the non-AP STA, e.g., 113, may not respond to the TF 123. For example, the STA 113 may miss the TF due to traffic collision. Or the STA 113 may not have any free medium to transmit data when the CS Required field (e.g., in the common information of the TF 123) is set to 1. On the AP 110 side, the AP 110 usually assumes all the non-AP STAs 111-113 (indicated in the TFs 121-123) will respond, and then may attempt to decode received information on each allocated spatial stream for a respective STA, e.g., using minimum mean square error (MMSE) or zero-forcing (ZF) equalization. ZF equalization is usually used to simplify the implementation complexity. However, in ZF equalization, it tries to null the signals from all the spatial streams other than itself, which is achieved by finding the null space of those other spatial streams based on the estimated channel matrix including channel information relating to all STAs 111-113. When a STA 113 is missing, e.g., no response to the TF 123 at 133, the corresponding estimated channel between the AP 110 and STA 113 is pure noise. Thus, if the signal (pure noise) from the channel between AP 110 and STA 113 is considered to generate the null space for other respective spatial streams for STAs 111-112, the channel estimation and the consequent ZF equalization can be rather inaccurate and the receiver performance at the AP 110 may be significantly degraded.

In this case, e.g., when one or more STAs such as 113 fails to respond to the TF, the AP 110 may use a user detection mechanism to remove the corresponding noisy channel between the AP 110 and STA 113 from the channel matrix.

Figure 2:
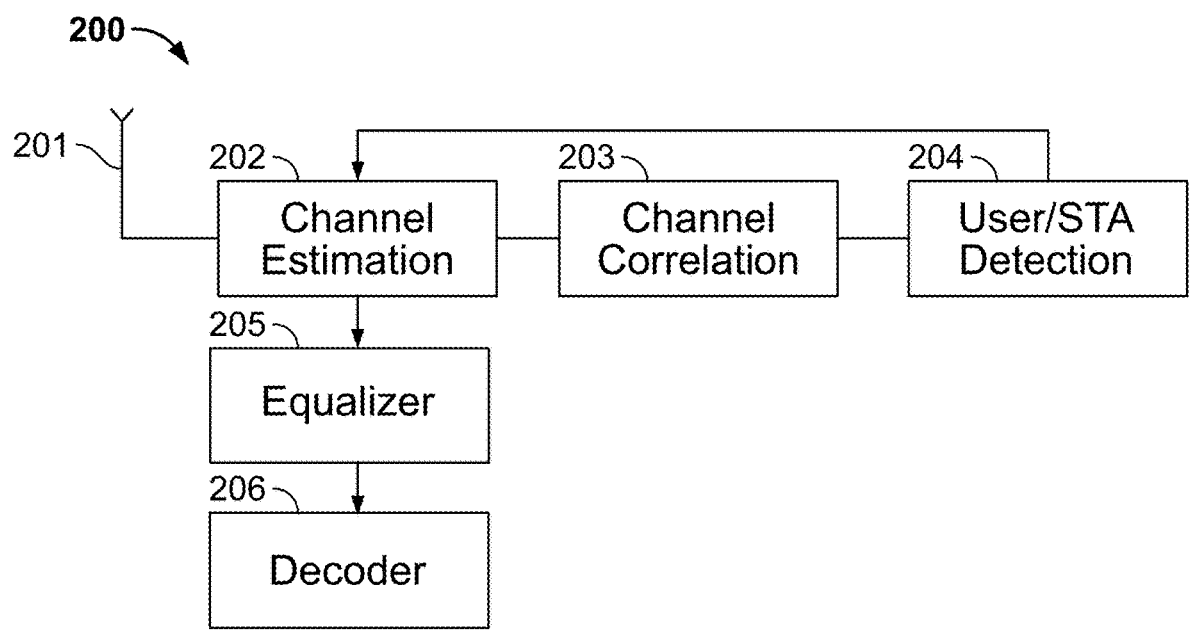
FIG. 2 provides a block diagram 200 illustrating channel correlation based user detection at a wireless receiver, according to embodiments described herein.

FIG. 2 provides a block diagram 200 illustrating channel correlation based user detection at a wireless receiver, according to embodiments described herein. The wireless receiver may be installed at the AP 110 shown at FIG. 1, which includes one or more antennas 201 to receive signals from a wireless channel, e.g., PPDUs 131, 132 from various STAs. A channel estimation block 202 may estimate the channel coefficients, e.g., in the form of a channel matrix H. The estimated channel matrix may be used at the equalizer 205 and decoder 206. Specifically, the channel estimation block 202 may employ a channel correlation block 203 and a user detection block 204 to refine the channel estimation result, e.g., by identifying scenarios when one or more STAs fail to respond to a TF (as shown at 133 in FIG. 1).

Specifically, under the 802.11ax UL MUMIMO transmission, each data symbol to be transmitted is pre-coded by a matrix P, wherein the start and the end of the rows of the P matrix is determined by the spatial stream allocation field in the user information of each TF. The dimension of the P matrix is related to the number $N_{HE-LTF}$ of HE-LTFs used in the PPDU 131-132, and is defined by 802.11ax as:

$$P_{HE-LTF} = \begin{cases} P_{4\times 4}, & N_{HE-LTF} \leq 4 \\ P_{6\times 6}, & N_{HE-LTF} = 5, 6 \\ P_{8\times 8}, & N_{HE-LTF} = 7, 8 \end{cases}$$

wherein $$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix},$$

$$P_{6\times 6} = \begin{bmatrix} 1 & -1 & 1 & 1 & 1 & -1 \\ 1 & -w & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

where $w = \exp\left(-\frac{j2\pi}{6}\right)$, and $$P_{4\times 4} = \begin{bmatrix} P_{4\times 4} & P_{4\times 4} \\ P_{4\times 4} & -P_{4\times 4} \end{bmatrix}.$$

The number of HE-LTF, $N_{HE-LTF}$, is no less than the total number of spatial streams with a maximum of 8. In the example shown in FIG. 1 that has three STAs 111-113, $N_{HE-LTF}=4$, $N_{ss,1}=2$, which denotes the number of spatial streams for STA 111; $N_{ss,2}=1$, which denotes the number of spatial streams for STA 112; and $N_{ss,3}=1$, which denotes the number of spatial streams for STA 113. Thus the first two rows of $P_{4\times 4}$ are allocated to STA 111, denoted as P(1:2,:); the third row of $P_{4\times 4}$ is allocated to STA 112, denoted as P(3,:); and the fourth row of $P_{4\times 4}$ is allocated to STA 113, denoted as P(4,:). Therefore, the nth symbol of the received signal at the receiver 201 during the HE-LTF duration on the kth tone is:

$$y_n^{(k)} = [H_1^{(k)} H_2^{(k)} H_3^{(k)}] \cdot \begin{bmatrix} P(1:2, :) \\ P(3, :) \\ P(4, :) \end{bmatrix} \cdot HE\_LTF_K + w_n^{(k)}$$

where $H_i^{(k)}$ denote the $N_r \times N_{ss,i}$ channel matrix for the ith STA (e.g., in the example shown in FIG. 1, $H_1^{(k)}$ denotes the channel matrix for STA 111, $H_2^{(k)}$ denotes the channel matrix for STA 112, and $H_3^{(k)}$ denotes the channel matrix for STA 113), $N_r$ denotes the number of receivers at the AP 110, and $N_{ss,i}$ denotes the number of spatial streams for the ith STA. $HE\_LTF_K$ denotes the HE-LTF sequence of the PPDU on the kth tone, and $w_n^{(k)}$ denotes the $N_r \times 1$ noise vector on the kth tone for the nth data symbol.

The channel estimation block 202 may preliminarily estimate the channel matrix for the ith STA as:

$$\hat{H}_i^{(k)} = y_{1:4}^{(k)} \cdot P^H\left(\sum_{m=1}^{i-1} N_{ss,m} + (1:N_{ss,i}), :\right) \cdot HE\_LTF_k$$

As shown above, the estimated channel matrix for each STA replies on the $HE\_LTF_K$. Thus, as shown in FIG. 1, if STA 113 does not respond to TF 123, the estimated channel matrix $\hat{H}_3^{(k)}$ may be noisy as the received "$HE\_LTF_K$" could be pure noise. (Thus, the estimated $\hat{H}_3^{(k)}$ should be removed from the whole estimated channel matrix $[H_1^{(k)} H_2^{(k)} H_3^{(k)}]$ before the channel matrix is passed to the equalizer 205 for better equalization performance. Similarly, only data from STAs 111 and 112 should be decoded at decoder 206 to save power because the data from STA 113 is pure noise.

To remove the noisy $\hat{H}_3^{(k)}$ from the whole channel matrix, in some embodiments, the channel energy for each STA may be compared, e.g., the channel energy of $\hat{H}_1^{(k)}, \hat{H}_2^{(k)}, \hat{H}_3^{(k)}$ may be compared against each other. The channel with relatively small energy may indicate that the corresponding STA does not respond to the TF. The channel energy comparison to rule out noisy channel may yield reasonable accuracy at higher signal-to-noise (SNR) scenarios, when the channels may exhibit significantly different energy levels with or without PPDU being transmitted thereon.

In some embodiments, a channel correlation block 203 may be used to compute channel correlation and then the user detection block 204 may detect whether a STA has transmitted or not at the HE-LTF. Upon receiving data transmission from the channel, the channel estimation block 202 may estimate the whole channel matrix based on the allocated STA information (e.g., number of HE-LTF, SS allocation in each user information field in the TFs the AP 110 has transmitted to the STAs). For example, the channel estimation block 202 may estimate the whole channel matrix based for STA 111-113 in FIG. 1 as $\hat{H}=[\hat{H}_1^{(k)}, \hat{H}_2^{(k)}, \hat{H}_3^{(k)}]$ without knowing that STA 113 does not respond to the TF 123.

For each column l in the channel matrix $\hat{H}$, the channel correlation block 203 may calculate the correlation for the neighboring two tones, e.g., $$\text{Corr}_l = \sum_{\substack{k \in K_{nb}, k+1 \in K_{nb}, \\ HE\_LTF_k \neq 0, \\ HE\_LTF_{k+1} \neq 0}} (\hat{h}_l^{(k)})^T \cdot (\hat{h}_l^{(k+1)})^*$$

wherein $\hat{h}_l^{(k)}$ denotes the $N_r \times 1$ channel vector for each column of the channel matrix $\hat{H}$; $(\ )^T$ denotes the transpose of the matrix; $(\ )^*$ denotes the conjugate of the matrix; $K_{nb}$ is the set of tone indices that are used to calculate the correlation, which may be related to the LTF type and user choice. For example, for 1×HE-LTF, pilots are also transmitted using multiple streams, and therefore $K_{nb}$ includes pilot tones. For another example, for 2×/4×HE-LTF, pilots depend on the MU MIMO LTF mode in the common information field in the TF, and thus $K_{nb}$ may skip the pilot tones. In some implementations, $K_{nb}$ may include only a subset of the tones in the full BW, to simplify the complexity of the correlation calculation (as long as satisfactory performance can be achieved).

The calculated correlation between adjacent columns may be summed up for each STA (denoted by index i), e.g., $$E_i = 10 \cdot \log 10 \left( \sum_{l=1+\Sigma_{m=1}^{i-1} N_{ss,m}}^{\Sigma_{m=1}^{i} N_{ss,m}} |\text{Corr}_l| \right), \text{ in dB}$$

wherein $N_{ss,m}$ denotes the number of spatial streams of the mth STA. For each STA, the calculated sum of correlation may be compared with the maximum correlation among the STAs:

$$\Delta_i = \max_{j \in J}\{E_j\} - E_i$$

where J denotes the set of indices of all STAs. Thus, the user detection block 204 may determine whether an STA responds to the corresponding TF by comparing the calculated $\Delta_i$ to a threshold $TH_{usr}$. Specifically, when $\Delta_i \geq TH_{usr}$, the ith STA is considered to have missed responding to the TF (e.g., see 133 in FIG. 1). Otherwise, when $\Delta_i < TH_{usr}$, the ith STA is considered to have transmitted data in response to the TF (e.g., see 131, 132 in FIG. 1). The threshold $TH_{usr}$ is configured as the threshold for the user detection.

Alternatively, the power difference between the STAs may be considered in the summed correlation as:

$$E_i = 10 \cdot \log 10 \left( \sum_{l=1+\Sigma_{m=1}^{i-1} N_{ss,m}}^{\Sigma_{m=1}^{i} N_{ss,m}} |\text{Corr}_l| \right) + \max\{R_i\} - R_i, \text{ in dB}$$

wherein $N_{ss,m}$ denotes the number of spatial streams of the mth STA, and $R_i$ denotes the value of target RSSI (e.g., B32-B38 in user information in the TF frame) expressed in dB. The calculated $E_i$ may then be used to calculate $\Delta_i$ for each STA in a similar manner as described above.

Alternatively, for each column l in the channel matrix $\hat{H}$, the correlation for the neighboring two tones may be calculated as:

$$\text{Corr}_l = \underbrace{\sum_{\substack{k \in K_{nb}, k+1 \in K_{nb}, \\ HE\_LTF_k \neq 0, \\ HE\_LTF_{k+1} \neq 0}} \|\hat{h}_l^{(k)}\|^2}_{E_{ch,l}} \cdot \underbrace{\sum_{\substack{k \in K_{nb}, k+1 \in K_{nb}, \\ HE\_LTF_k \neq 0, \\ HE\_LTF_{k+1} \neq 0}} \sum_{t=1}^{N_r} e^{j(\phi_{t,l}^{(k)} - \phi_{t,l}^{(k+1)})}}_{C_{ch,l}} = E_{ch,l} \cdot C_{ch,l}$$

wherein $\hat{h}_l^{(k)}$ denotes the $N_r \times 1$ channel vector for each column of the channel matrix $\hat{H}$; $(\ )^T$ denotes the transpose of the matrix; $(\ )^*$ denotes the conjugate of the matrix; $K_{nb}$ is the set of tone indices that are used to calculate the correlation, which may be related to the LTF type and user choice; $\Phi_{t,l}^{(k)}$ is the quantized phase part for the t-th element in $\hat{h}_l^{(k)}$; $E_{ch,l}$ is the power of the l-th spatial stream over $K_{nb}$; $C_{ch,l}$ is the sum of the correlation for phase only quantized channel at the l-th spatial stream.

Alternatively, for each column l in the channel matrix $\hat{H}$, the correlation for the neighboring two tones may also be calculated as:

$$\text{Corr}_l = \underbrace{\sum_{\substack{k \in K_{nb}, k+1 \in K_{nb}, \\ HE\_LTF_k \neq 0, \\ HE\_LTF_{k+1} \neq 0}} \|\hat{h}_l^{(k)}\|}_{E_{ch,l}} \cdot \underbrace{\sum_{\substack{k \in K_{nb}, k+1 \in K_{nb}, \\ HE\_LTF_k \neq 0, \\ HE\_LTF_{k+1} \neq 0}} \sum_{t=1}^{N_r} e^{j(\phi_{t,l}^{(k)} - \phi_{t,l}^{(k+1)})}}_{C_{ch,l}} = E_{ch,l} \cdot C_{ch,l}$$

To calculate the power in dB for each STA, the summed correlation may be calculated as:

$$E_i = 20 \cdot \log_{10} \left( \frac{1}{\sqrt{N_{ss,i}}} \cdot \sum_{l=1+\Sigma_{m=1}^{i-1} N_{ss,m}}^{\Sigma_{m=1}^{i} N_{ss,m}} |\text{Corr}_l| \right), \text{ in dB}$$

In various embodiments, the calculation of the correlation $\text{Corr}_l$ is not limited to the above examples, and may take different forms.

In some embodiments, the user detection block 204 may transmit the detected user or missing user information to the channel estimation block 202 to revise the estimated channel matrix. For example, when one or more STAs are detected as non-existent (e.g., non-responsive to the TF), the corresponding channel columns may be removed from the estimated channel matrix for equalization and decoding. Specifically, in the above example, as STA 113 does not respond to the TF 123, $\hat{H}_3^{(k)}$ may be removed from the channel matrix $[\hat{H}_1^{(k)}, \hat{H}_2^{(k)}, \hat{H}_3^{(k)}]$ for next-step equalization and decoding. In this way, by removing the noisy channel vectors from the channel matrix, performance of the zero-forcing type equalization may be improved. In addition, as the dimension of the channel matrix, and consequently the dimension of the received signal vector are all reduced, decoding complexity is also decreased, and thus the receiver can be operated at a more power efficient way.

Within embodiments, the channel correlation based user detection described in relation to FIG. 2 may be used in a partial bandwidth transmission (e.g., when the resource unit with the bandwidth is smaller than the full bandwidth) of an orthogonal frequency division multiple access (OFDMA) based UL PPDU for UL MUMIMO user detection.

In other embodiments, the channel correlation based user detection described in relation to FIG. 2 may be used in UL-OFDMA for resource unit detection. For example, when each user occupies one resource unit, the channel correlation $Corr_1$ may be calculated for each column 1 (representing each resource unit) in the channel matrix, wherein $K_{nb}$ may be limited to each resource unit separately. As the size of resource unit corresponding to each user may be different, the size difference is considered in the correlation calculation. For example, the correlation calculation equation may be implemented as:

$$Corr_l = \frac{1}{|K_{nb}|} \sum_{\substack{k \in K_{nb}, k+1 \in K_{nb}, \\ HE\_LTF_k \neq 0, \\ HE\_LTF_{k+1} \neq 0}} (\hat{h}_l^{(k)})^T \cdot (\hat{h}_l^{(k+1)})^*$$

where $|K_{nb}|$ is the cardinality of the tone set $K_{nb}$ for particular resource unit.

The channel correlation may then be summed up for all spatial streams in each resource unit, and then the summed correlation for each resource unit is compared to the maximum summer correlation corresponding to a particular resource unit. The compared difference is compared with a threshold, in a similar manner, to determine whether the resource unit exists.

Figure 3:
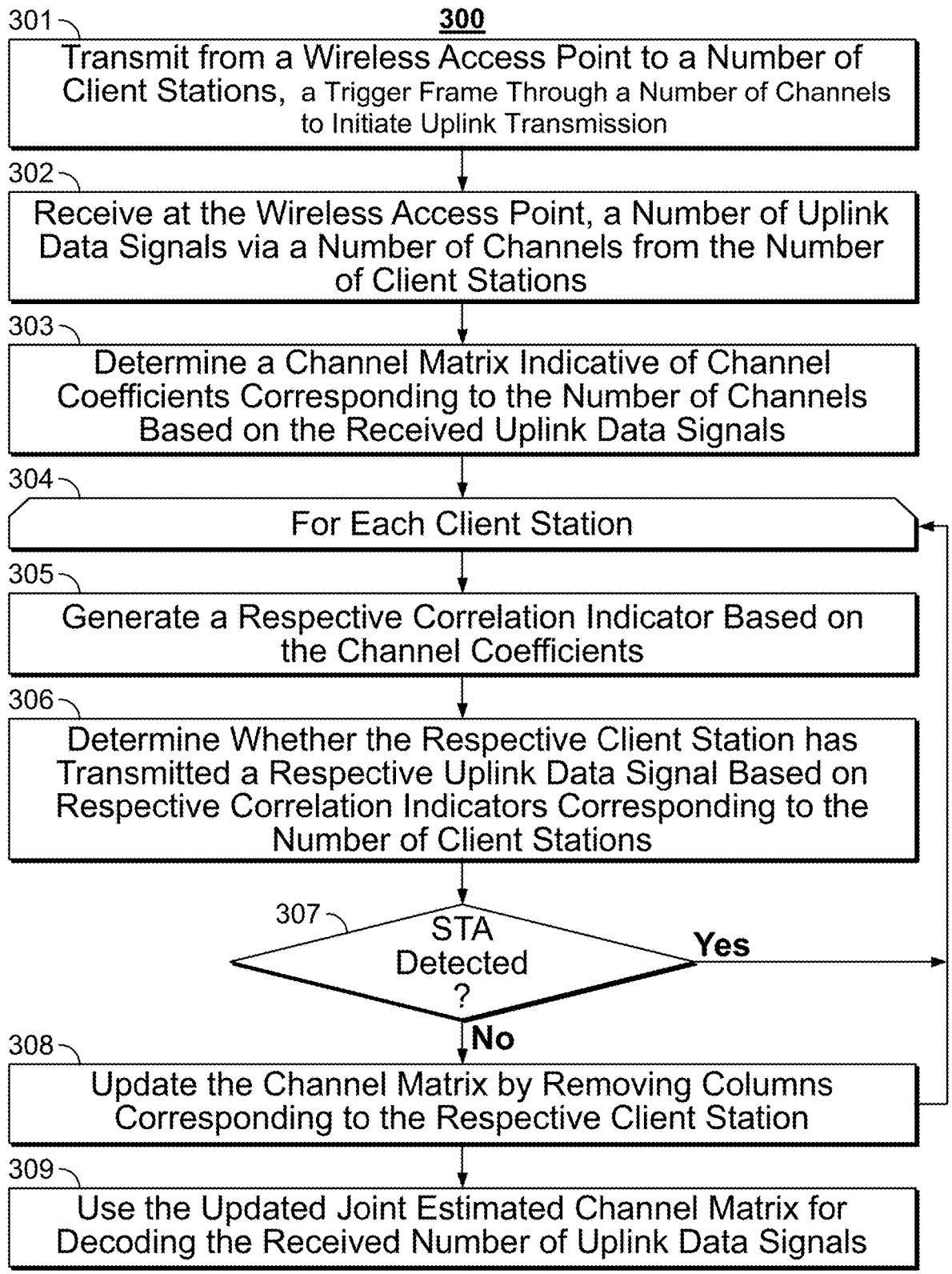
FIG. 3 provides an example logic flow diagram 300 illustrating detecting a user based on channel correlation in an uplink multi-user transmission of a multiple-input multiple-output network, according to embodiments described herein.

FIG. 3 provides an example logic flow diagram 300 illustrating detecting a user based on channel correlation in an uplink multi-user transmission of a multiple-input multiple-output network, according to embodiments described herein. At 301, a trigger frame through a number of channels (e.g., see 121-123 in FIG. 1) to initiate uplink transmission may be transmitted, from a wireless access point (e.g., 110 in FIG. 1) to a number of client stations (e.g., 111-113 in FIG. 1). At 302, the wireless access point may receive a number of uplink data signals (e.g., 131, 132 in FIG. 1) via a number of channels from the number of client stations (e.g., 111-113 in FIG. 1). At 303, a channel matrix may be determined indicative of channel coefficients corresponding to the number of channels based on the received uplink data signals. At 304, for each client station, a respective correlation indicator may be generated based on the channel coefficients at 305. At 306, the wireless access point may determine whether the respective client station has transmitted a respective uplink data signal based on respective correlation indicators corresponding to the number of client stations. At 307, if the client station is detected (e.g., the respective client station has transmitted a respective uplink data signal), process 300 proceeds to repeat 304-306 until all client stations have been exhausted. At 307, if the client station is not detected (e.g., the respective client station has not transmitted a respective uplink data signal), process 300 proceeds to 308, where the channel matrix is updated by removing columns corresponding to the respective client station when the respective client station has not transmitted a respective uplink data signal. At 309, the updated joint estimated channel matrix is then used for equalizing and/or decoding the received number of uplink data signals.

Figure 4:
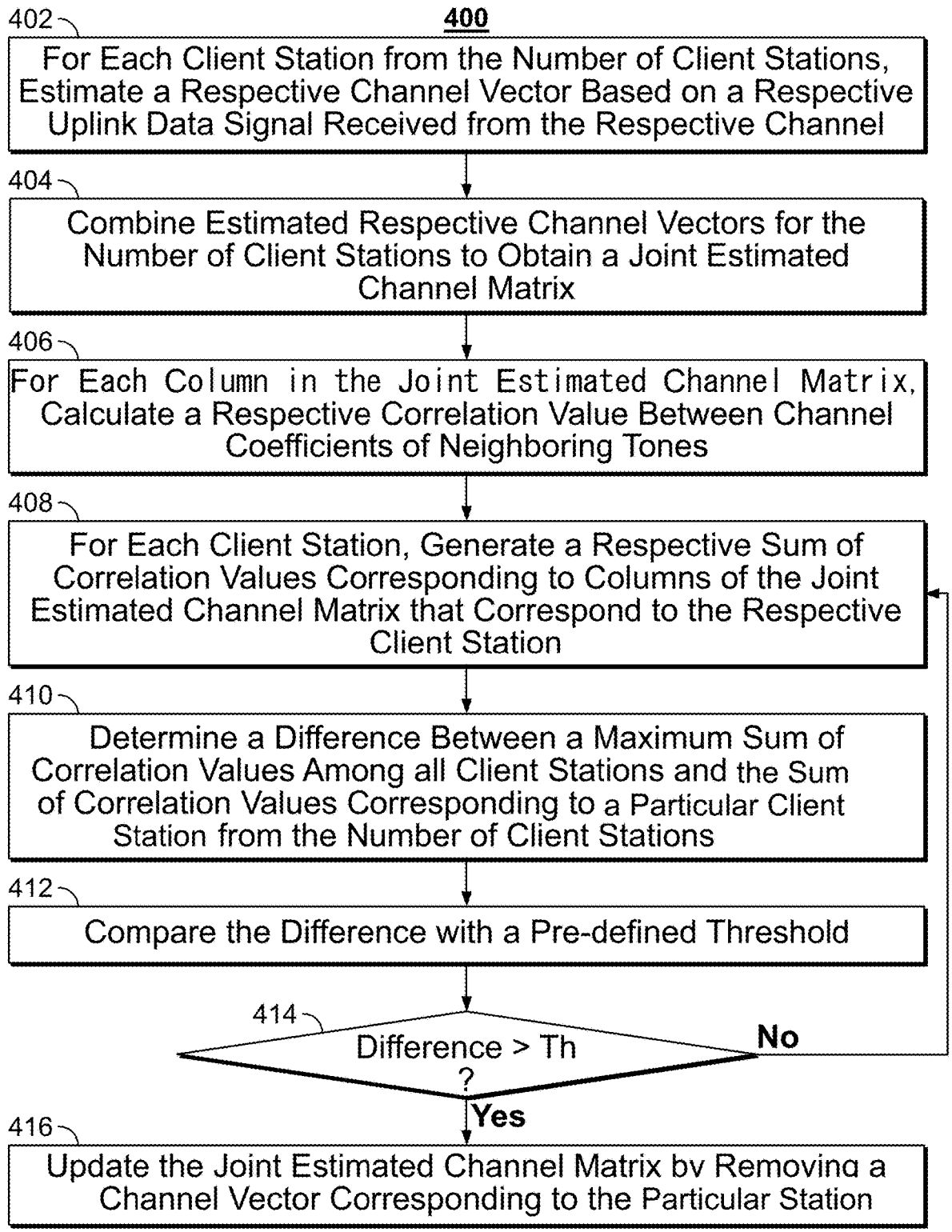
FIG. 4 provides an example logic flow diagram illustrating determining whether the respective client station has transmitted a respective uplink data signal based on respective correlation indicators corresponding to the number of client stations, according to embodiments described herein.

FIG. 4 provides an example logic flow diagram 400 illustrating determining whether the respective client station has transmitted a respective uplink data signal based on respective correlation indicators corresponding to the number of client stations (e.g., 306 in FIG. 3), according to embodiments described herein. At 402, for each client station from the number of client stations, the wireless access point may estimate a respective channel vector based on a respective uplink data signal received from the respective channel. At 404, the wireless access point may combine estimated respective channel vectors for the number of client stations to obtain a joint estimated channel matrix. At 406, for each column in the joint estimated channel matrix, a respective correlation value may be calculated between channel coefficients of neighboring tones. At 408, for each client station, a respective sum of correlation values may be generated corresponding to columns of the joint estimated channel matrix that correspond to the respective client station. At 410, a difference between a maximum sum of correlation values among all client stations and the sum of correlation values corresponding to a particular client station from the number of client stations may be determined. At 412, the difference may be compared with a pre-defined threshold. At 414, when the difference is greater than the threshold, process 400 proceeds to 416, where the joint estimated channel matrix is updated by removing the channel vectors corresponding to the particular client station. At 414, when the difference is no greater than the pre-defined threshold, process 400 proceeds to 408 to repeat 408-414 until all client stations are exhausted.

Figure 5:
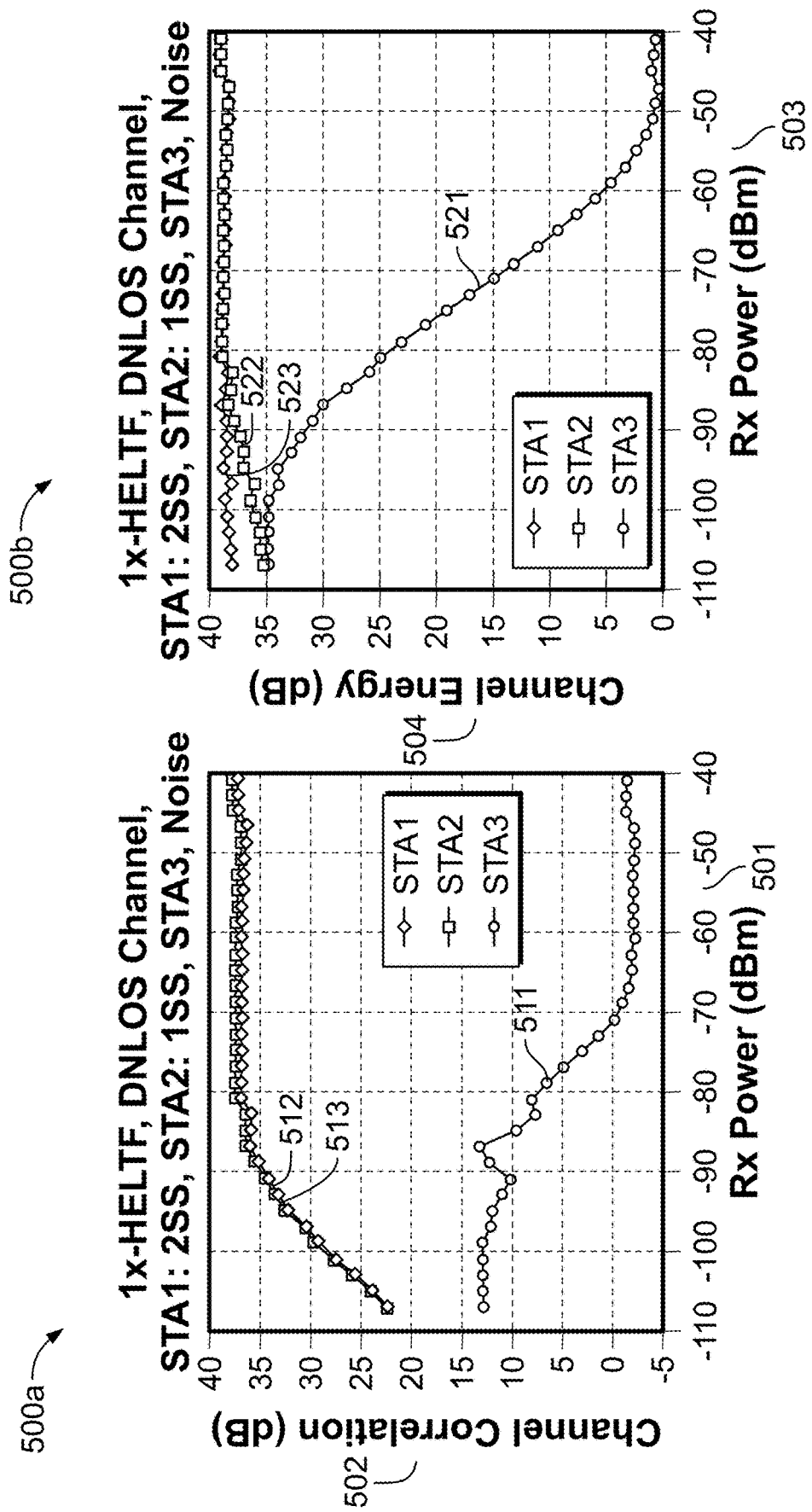
FIG. 5 shows example data plots illustrating the performance of a three-STA system similar to the system described in FIG. 1, using the channel correlation based user detection described in FIG. 2, according to some embodiments described herein.

FIG. 5 shows example data plots illustrating the performance of a three-STA system similar to the system described in FIG. 1, using the channel correlation based user detection described in FIG. 2, according to some embodiments described herein. In this particular example, three STAs are present: $N_{HE-LTF}$=4, $N_{ss,1}$=2, $N_{ss,2}$=1, $N_{ss,3}$=1, and STA 113 (indexed as i=3) did not respond to the TF (e.g., see 123 in FIG. 1). For Nr=8, 1×HE-LTF, BW=80 MHz and non-line-of-sight channel, diagram 500a shows the calculated channel correlations 502 (e.g., the Y-axis of diagram 500a) for STAs (111-113 in FIG. 1) over different receiver power 501 (e.g., the X-axis of diagram 500a). For STA 113 that does not respond to the TF, the calculated correlation 511 is significantly lower than the channel correlations 512 and 513 corresponding to STAs 111 and 112 which transmit PPDUs over their respective channel. Diagram 500b shows the channel energy 504 (e.g., the Y-axis of diagram 500b) for STAs (111-113 in FIG. 1) over different receiver power 503 (e.g., the X-axis of diagram 500b). For STA 113 that does not respond to the TF, at a high SNR (higher receiver power) regime, the channel energies 522, 523 and 521 corresponding to the channels for STAs 111-113 are significantly different, e.g., with STA 113 exhibiting a much lower channel energy at 521 compared to 522 and 523. However, at a lower SNR regime, channel energy 521-523 may not be distinguishable between STAs that have transmitted PPDUs (STAs 111-112) and STAs that does not transmit (STA 113). Therefore, channel correlation may yield a more accurate result in detecting non-existing users (e.g., STAs that do not respond to the TFs) than channel energy comparison.

Various embodiments discussed in conjunction with FIGS. 1-5 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless AP, LP devices discussed in relation to FIGS. 1-5), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIGS. 3-4 does not necessarily require the particular order shown, or sequential order, to achieve desirable results. In certain implementations, multitasking and parallel processing may be advantageous. Other variations are within the scope of the following claims.

What is claimed is:

1. A method for detecting a client station in an uplink multi-user transmission of a multiple-input multiple-output network, the method comprising:
   transmitting, from a wireless access point to a number of client stations, a number of trigger frames to initiate uplink transmission;
   receiving, at the wireless access point, a number of uplink data signals via a number of channels from the number of client stations;
   determining a channel matrix indicative of channel coefficients corresponding to the number of channels based on the received uplink data signals;
   determining that a respective client station of the number of client stations has not transmitted a respective uplink data signal based on the channel matrix indicative of the channel coefficients corresponding to the number of channels;
   updating the channel matrix by removing columns corresponding to the respective client station of the number client stations when the respective client station has not transmitted the respective uplink data signal; and
   using the updated channel matrix for equalization and decoding the received number of uplink data signals.

2. The method of claim 1, wherein determining that the respective client station of the number of client stations has not transmitted the respective uplink data signal based on the channel matrix comprises:
   for each client station:
      generating a respective correlation indicator based on the channel coefficients, and
      detecting flail the respective client station by determining whether the respective client station has transmitted flail the respective uplink data signal based on respective correlation indicators corresponding to the number of client stations.

3. The method of claim 1, wherein the determining the channel matrix indicative of channel coefficients corresponding to the number of channels based on the received uplink data signals comprises:
   retrieving a pre-defined matrix based on a total number of spatial streams; and
   using the pre-defined matrix to generate the channel matrix comprised of a number of sub-matrices based on the received number of uplink data signals, each of the number of sub-matrices corresponding to a respective channel from the number of channels.

4. The method of claim 1, wherein the determining the channel matrix indicative of channel coefficients corresponding to the number of channels based on the received uplink data signals comprises:
   for each client station from the number of client stations, estimating a respective channel vector based on a respective uplink data signal received from a respective channel of the number of channels; and
   combining estimated respective channel vectors for the number of client stations to obtain a joint estimated channel matrix.

5. The method of claim 2, wherein the generating the respective correlation indicator based on the channel coefficients comprises:
   for each column in the joint estimated channel matrix, calculating a respective correlation value between channel coefficients of two neighboring tones; and
   for each client station from the number of client stations, generating a respective sum of correlation values corresponding to columns of the joint estimated channel matrix that correspond to the respective client station.

6. The method of claim 5, further comprising:
   retrieving a target receive power value corresponding to the respective client station;
   computing a power difference between the retrieved target receive power value and a maximum target receive power value among the number of client stations; and
   adding the power difference to the respective sum of correlation values.

7. The method of claim 5, wherein the calculating of the respective correlation value between channel coefficients of two neighboring tones comprises:
   computing a product of a power value corresponding to a respective spatial stream and a sum of correlations for phase-only quantized channel at the respective spatial stream.

8. The method of claim 2, wherein the determining of whether the respective client station has transmitted the respective uplink data signal based on respective correlation indicators corresponding to the number of client stations comprises:
   determining a difference between a maximum sum of correlation values among all client stations and a first sum of correlation values corresponding to a first client station from the number of client stations; and
   comparing the difference with a pre-defined threshold.

9. The method of claim 6, further comprising:
   in response to determining that the difference is greater than the pre-defined threshold, updating the joint estimated channel matrix by removing a first channel vector corresponding to the first client station.

10. The method of claim 1, further comprising:
    receiving, at the wireless access point, a number of uplink data signals via a number of resource units from the number of client stations, wherein each client station from the number of client stations occupies a respective resource unit;
    generating the respective correlation indicator based on the channel coefficients subject to a respective resource unit; and determining whether the resource unit is available based on respective correlation indicators corresponding to a number of resource units.

11. A system for detecting a client station in an uplink multi-user transmission of a multiple-input multiple-output network, the system comprising:
   a wireless transceiver configured to:
      transmit, from a wireless access point to a number of client stations, a number of trigger frames to initiate uplink transmission, and
      receive, at the wireless access point, a number of uplink data signals via a number of channels from the number of client stations; and
   processing circuitry configured to:
      determine a channel matrix indicative of channel coefficients corresponding to the number of channels based on the received uplink data signals;
      determine that a respective client station of the number of client stations has not transmitted a respective uplink data signal based on the channel matrix indicative of the channel coefficients corresponding to the number of channels;
      update the channel matrix by removing columns corresponding to flail the respective client station of the number of client stations when the respective client station has not transmitted the respective uplink data signal; and
      use the updated channel matrix for equalization and decoding the received number of uplink data signals.

12. The system of claim 11, wherein the processing circuitry, when, determining that a respective client station of the number of client stations has not transmitted a respective uplink data signal based on the channel matrix is configured to:
   for each client station:
      generate a respective correlation indicator based on the channel coefficients, and
      detect flail the respective client station by determining whether the respective client station has transmitted a respective uplink data signal based on respective correlation indicators corresponding to the number of client stations.

13. The system of claim 11, wherein the processing circuitry, when determining the channel matrix indicative of channel coefficients corresponding to the number of channels based on the received uplink data signals, is configured further to:
   retrieve a pre-defined matrix based on a number total number of spatial streams; and
   use the pre-defined matrix to generate the channel matrix comprised of a number of sub-matrices based on the received number of uplink data signals, each of the number of sub-matrices corresponding to a respective channel from the number of channels.

14. The system of claim 11, wherein the processing circuitry, when determining the channel matrix indicative of channel coefficients corresponding to the number of channels based on the received uplink data signals, is configured further to:
   for each client station from the number of client stations, estimate a respective channel vector based on a respective uplink data signal received from a respective channel of the number of channels; and
   combine estimated respective channel vectors for the number of client stations to obtain a joint estimated channel matrix.

15. The system of claim 14, wherein the processing circuitry, when generating the respective correlation indicator based on the channel coefficients, is configured further to:
   for each column in the joint estimated channel matrix, calculate a respective correlation value between channel coefficients of two neighboring tones; and
   for each client station from the number of client stations, generate a respective sum of correlation values corresponding to columns of the joint estimated channel matrix that correspond to the respective client station.

16. The system of claim 15, wherein the processing circuitry is further configured to:
   retrieve a target receive power value corresponding to the respective client station;
   compute a power difference between the retrieved target receive power value and a maximum target receive power value among the number of client stations; and
   add the power difference to the respective sum of correlation values.

17. The system of claim 15, wherein the processing circuitry, when calculating the respective correlation value between the channel coefficients of the two neighboring tones, is further configured to:
   compute a product of a power value corresponding to a respective spatial stream and a sum of correlations for phase-only quantized channel at the respective spatial stream.

18. The system of claim 15, wherein the processing circuitry, when determining whether the respective client station has transmitted the respective uplink data signal based on respective correlation indicators corresponding to the number of client stations, is configured further to:
   determine a difference between a maximum sum of correlation values among all client stations and a first sum of correlation values corresponding to a first client station from the number of client stations; and
   compare the difference with a pre-defined threshold.

19. The system of claim 16, wherein the processing circuitry is further configured to:
   in response to determining that the difference is greater than the pre-defined threshold, update the joint estimated channel matrix by removing a first channel vector corresponding to the first client station.

20. The system of claim 11, wherein the processing circuitry is further configured to:
   receive, at the wireless access point, a number of uplink data signals via a number of resource units from the number of client stations, wherein each client station from the number of client stations occupies a respective resource unit;
   generate the respective correlation indicator based on the channel coefficients subject to a respective resource unit; and
   determine whether the resource unit is available based on respective correlation indicators corresponding to a number of resource units.

21. The method of claim 1, wherein determining that the respective client station of the number of client stations has not transmitted the respective uplink data signal comprises determining based on the channel coefficients in the channel matrix a respective channel energy indicator for each client station; and determining that the respective client station has not transmitted the respective uplink data signal based on a comparison of respective channel energy indicators corresponding to the number of client stations.

22. The system of claim 11, wherein the processing circuitry configured to determine that the respective client station of the number of client stations has not transmitted the respective uplink data signal comprises processing circuitry configured to determine based on the channel coefficients in the channel matrix a respective channel energy indicator for each client station; and determine that the respective client station has not transmitted the respective uplink data signal based on a comparison of respective channel energy indicators corresponding to the number of client stations.

* * * * *